(12) United States Patent
Daly et al.

(10) Patent No.: US 10,366,222 B2
(45) Date of Patent: Jul. 30, 2019

(54) MANAGING PASSWORDS USING STEGANOGRAPHY

(71) Applicant: INTERNATIONAL BUSINESS MACHINES CORPORATION, Armonk, NY (US)

(72) Inventors: Elizabeth M. Daly, Monkstown (IE); Martin J. Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 15/368,391

(22) Filed: Dec. 2, 2016

(65) Prior Publication Data
US 2018/0157824 A1    Jun. 7, 2018

(51) Int. Cl.
| | |
|---|---|
| *G06F 21/36* | (2013.01) |
| *H04N 7/18* | (2006.01) |
| *H04W 12/06* | (2009.01) |
| *H04L 29/06* | (2006.01) |
| *G06T 1/00* | (2006.01) |

(52) U.S. Cl.
CPC .......... *G06F 21/36* (2013.01); *G06T 1/0021* (2013.01); *H04L 63/0428* (2013.01); *H04N 7/183* (2013.01); *H04W 12/0608* (2019.01); *H04N 7/185* (2013.01)

(58) Field of Classification Search
CPC ........ H04N 7/183; H04N 7/185; G06F 21/36; G06T 1/0021; H04W 12/0608; H04L 63/0428
See application file for complete search history.

(56) References Cited

U.S. PATENT DOCUMENTS

| | | | |
|---|---|---|---|
| 7,751,584 B2 | 7/2010 | Zimmer et al. | |
| 2005/0169496 A1 | 8/2005 | Perry | |
| 2007/0277224 A1* | 11/2007 | Osborn | G06F 21/36 726/2 |
| 2008/0310629 A1 | 12/2008 | Veen et al. | |
| 2010/0043062 A1 | 2/2010 | Alexander et al. | |
| 2016/0189127 A1* | 6/2016 | Amarnath | G06K 19/06037 705/18 |
| 2016/0246970 A1* | 8/2016 | Otero | G06F 21/6209 |

OTHER PUBLICATIONS

Anonymous, "Steganography," Wikipedia Article downloaded Sep. 2016.

(Continued)

*Primary Examiner* — Ayoub Alata
(74) *Attorney, Agent, or Firm* — Intelletek Law Group, PLLC; Gabriel Daniel, Esq.

(57) ABSTRACT

A computer system, method, and computer readable product are provided for managing passwords using steganography. In various embodiments, a computing system provides a password manager that a user provides a password to. The user then selects a service for which credentials will be generated or stored, and an image on the user's device that will be used to steganographically store the credentials. The computing system then generates a steganographic image that includes the credentials and stores that image with the other images on the user's device.

20 Claims, 5 Drawing Sheets

(56) References Cited

OTHER PUBLICATIONS

Cheong et al., "Secure Encrypted Steganography Graphical Password Scheme for Near Field Communication Smartphone Access Control System," Expert Systems with Applications vol. 41, Issue 7, pp. 3561-3568, Jun. 2014.

Hussain et al., "Secure Password Transmission for Web Applications Over Internet Using Cryptography and Image Steganography," International Journal of Security and Its Applications, vol. 9, No. 2, pp. 179-188, Feb. 2015.

Nagaria et al., "Steganographic Approach for Data Hiding using LSB Techniques," International Journal of Advanced Computer Research, vol. 2, No. 4, Issue 6, pp. 429-434, Dec. 2012.

Shahreza, Mohammad Shirali, "An Improved Method for Steganography on Mobile Phone," WSEAS Transactions on Systems 4.7 (2005): 955-957.

Vinod et al., "Captcha as Graphical Password for High Security," Global Journal of Advanced Engineering Technologies, vol. 4, Issue 4, pp. 378-381, 2015.

* cited by examiner

MANAGING PASSWORDS USING STEGANOGRAPHY

BACKGROUND

Technical Field

The present disclosure generally relates to storing information using steganography, and more particularly, to storing passwords using steganography.

Description of the Related Art

Steganography is embedding or concealing information within other information. For example, a file, message, image, or video may be concealed within another file, message, image, or video. Steganography may be used to protect information by concealing the fact that this information exists. In digital information used by computers, steganography may be implemented, for example, by altering every Nth bit of a file, such that the collected Nth bits of the file contain the protected information.

SUMMARY

In various embodiments, a computing system that implements an embodiment of the present disclosure receives a master password for a password manager, and determines that the master password is valid. Then, the computing system displays a plurality of images that are stored in a computer memory. The computing system receives user input indicative of selecting a first image of the plurality of images, receives an indication of a computer service for which a first password is to be stored, and receives an indication of the first password.

The computing system then generates a steganographic image based on the first image and the indication of the first password. Finally, the computing system replaces the first image with the steganographic image in the plurality of images stored in the computer memory.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Figure 1:
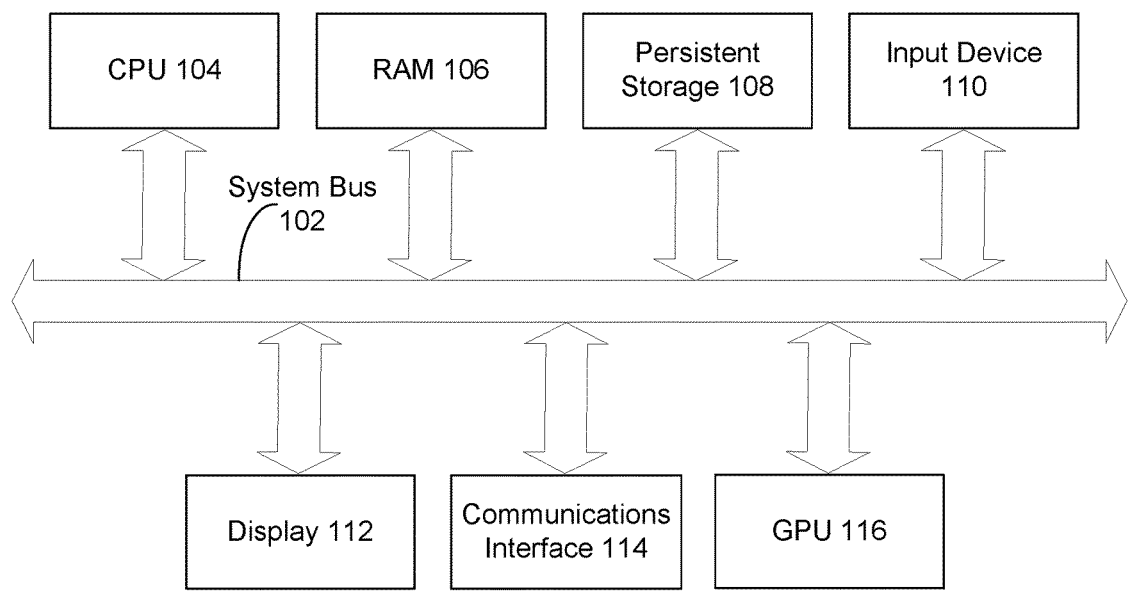
FIG. 1 illustrates examples of hardware used according to some embodiments of the present disclosure.

FIG. 1 illustrates an example of hardware used according to an embodiment of the present disclosure. As shown in FIG. 1, a block diagram illustrates various computer hardware that may be used for managing passwords using steganography.

The CPU (central processing unit) 104, the RAM (random access memory) 106, the persistent storage 108, the input device 110, the display 112, the communications interface 114, the GPU (graphics processing unit) 116, and the sensor 118 are connected to a system bus 102. It may be appreciated that the system bus 102 is presented logically and simplified, and that two or more of these components may be communicatively coupled by one or more separate buses. It also may be appreciated that the depictions of the CPU 104 and the GPU 116 are simplified to emphasize the components that are depicted—for example they omit hardware that controls the flow of computer-executable instructions within them.

In FIG. 1, the persistent storage 108, in one embodiment, has capabilities that include storing a program that can execute the processes described herein. The persistent storage 108, in an embodiment of the present disclosure, can store multiple images used in steganography. Additionally, in FIG. 1, an input device 110, such as a keyboard and a mouse may be used to provide input to the computer hardware of FIG. 1.

In one embodiment, the communications interface 114 of FIG. 1 is connected to a communications network using a Wi-Fi (wireless-fidelity) or LTE (long-term evolution) network communications protocol. The communications interface 114 may also comprise a NIC (network interface card) that is connected to a communications network via an Ethernet cable. In the present disclosure, the communications interface 114 may be used to transmit information about a user's credentials (e.g., username and password) to an online service that requests them. For example, a remote computer server may provide an online email service, and where a user directs a password manager to provide credentials to the remote computer server in order to login and check his or her email, these credentials may be sent via the communications interface 114. These external computers may be accessible via a communications network.

The communications interface 114 may receive processing requests in accordance with a communication protocol, such as TCP/IP (Transmission Control Protocol/Internet Protocol), from another computer (not shown), and processing results are sent to a third computer (not shown). As depicted, the communications interface 114 may comprise hardware for transmitting and receiving network data, and/or processor-executable instructions for doing the same.

The sensor 118 may be one of a variety of sensors that is configured to capture health data from a person. The sensor 118 may be a sensor that captures a person's hormone levels, glucose levels, heart rate, sleep patterns, breathing patterns, stress levels, body temperature, stress levels, or food and caloric intake.

Figure 2:
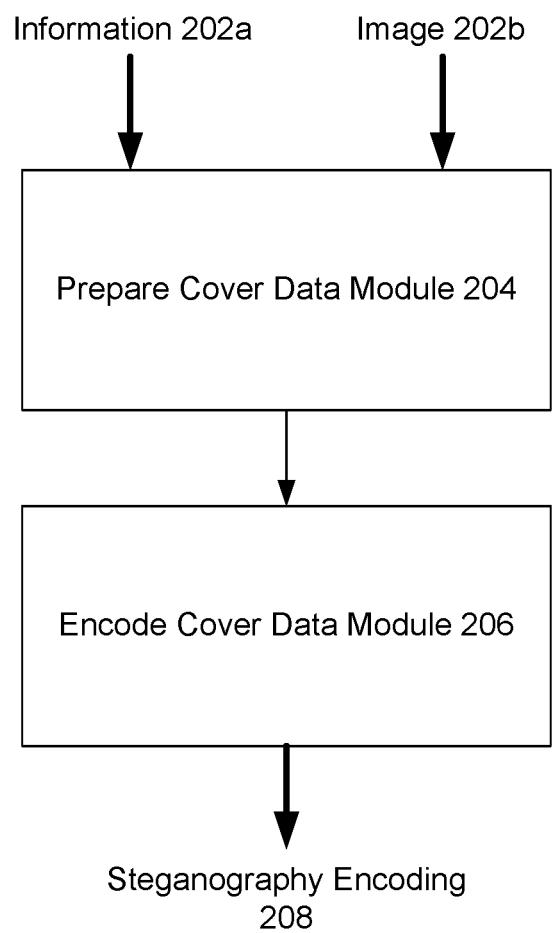
FIG. 2 illustrates an example of a system architecture used according to some embodiments of the present disclosure.

FIG. 2 illustrates an example of a system architecture used according to some embodiments of the present disclosure. In some embodiments, a prepare cover data module 204 and an encode cover data module 206 may be implemented in one or more instances of the computer hardware of FIG. 1 to produce some of the operations of FIGS. 4-5, discussed later.

Inputs to the system architecture of FIG. 2 are an information 202a and an image 202b. Then, the output to the system architecture of FIG. 2 is a stenography encoding 208. The steganography encoding 208 may comprise an image similar to the image 202b that also has stored within it a representation of the information 202a. That is, the system architecture of FIG. 2 may be used to steganographically encode information within images. It may be appreciated that the information 202a may comprise different types of digital information than passwords, such as, without limitation, another image or video, or similar information. Likewise, it may be appreciated that while it is depicted here that an image—the image 202b—is used to store the information, other types of digital information like video or text may be used to store the information.

The information 202a and the image 202b are received by the prepare cover data module 204. In some embodiments, the prepare cover data module 204 may validate that the image 202b is appropriate to steganographically encode the information 202a. For instance, the prepare cover data module 204 may determine whether a size of the image 202b in bits is appropriately large relative to a size of the information 202a in bits, or that the image 202b has not previously been lossy compressed.

After processing by the prepare cover data module 204, the encode cover data module 206 further processes the data. In some embodiments, the encode cover data module 206 may produce a steganographic image by encoding the information 202a within the image 202b. The encode cover data module 206 may encode the information 202a within the image 202b in a number of ways. As a simplified example, the encode cover data module 206 may change the least significant bit of a set of color values of the image 202b such that those least significant bits together comprise the information 202a as expressed in bits. By modifying the least significant bits of the color values, the color values are changed a minor amount, so the image 202b will not vary much as compared to its original version when displayed. It may be appreciated that more involved techniques for encoding the information 202a within the image 202b may be implemented, and that this "least significant bit" approach is one example.

Once the encode cover data module 208 has finished processing the data, the encode cover data module 208 outputs a steganography encoding 208. The steganography encoding 208 may be similar to the steganographic image produced in operation 410 of FIG. 4, or to the image from which a password is extracted in operation 514 of FIG. 5.

Figure 3:
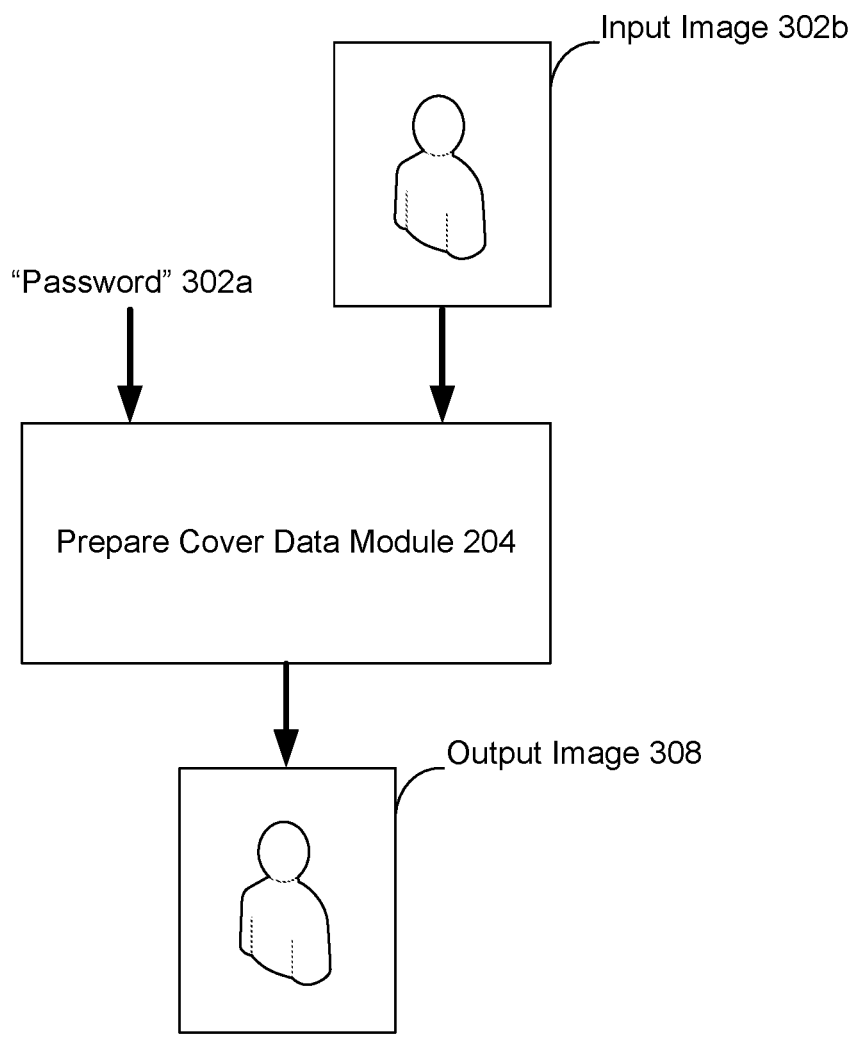
FIG. 3 illustrates an example of encoding a password using steganography according to some embodiments of the present disclosure.

FIG. 3 illustrates an example of encoding a password using steganography according to some embodiments of the present disclosure. As depicted, a steganographic encoding module 304 receives as input information to be encoded ("password" 302a, which may be the literal character string, password), and an image 302b. The steganographic encoding module 304 may then perform functions similar to those performed by the both prepare cover data module 204 and the encode cover data module 206 of FIG. 2, to produce some of the operations of FIGS. 4-5.

Once the steganographic encoding module 304 performs steganographic encoding processes, the output is an image 308. It may be appreciated that, as depicted, the input image 302b and the output image 308 are visually identical. There may be embodiments where there is a small visual difference between the input image 302b and the output image 308, but it is minor enough that a viewer would be unlikely to appreciate that the output image 308 has been modified from the input image 302b without directly comparing it to the input image 302b (either via visual inspection, or via using a computer-based comparison tool).

Figure 4:
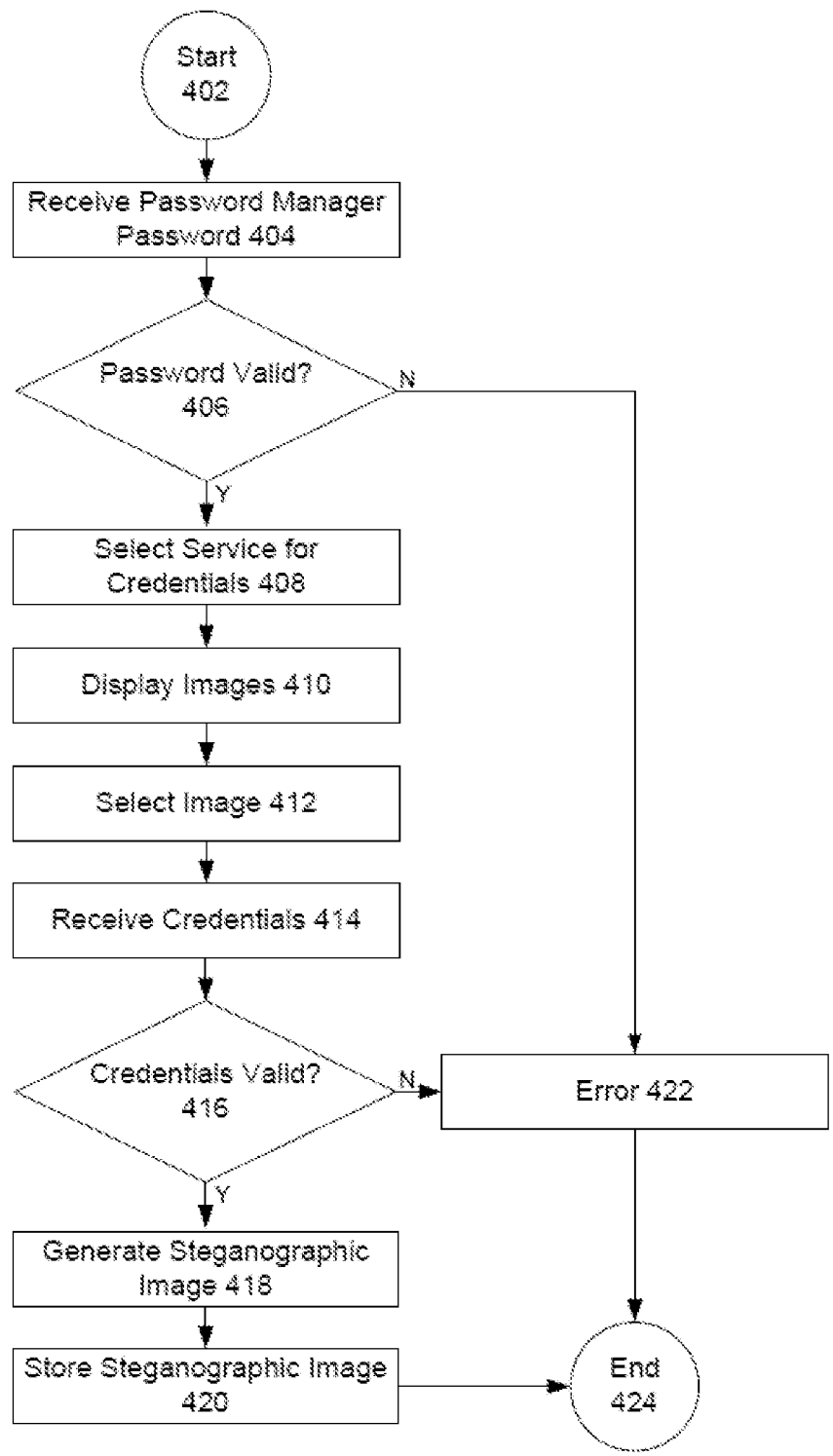
FIG. 4 illustrates an example process for encoding a password using steganography according to some embodiments of the present disclosure.

FIG. 4 illustrates an example process for encoding a password using steganography according to some embodiments of the present disclosure. In some embodiments, the process of FIG. 4 may be implemented on the computer hardware of FIG. 1 or the system architecture of FIG. 2 to effectuate managing passwords using steganography, such as is depicted in FIG. 4. In some embodiments, the process of FIG. 4 may be implemented to effectuate a computer-implemented method for managing passwords using steganography.

It may be appreciated that the process of FIG. 4 is an example process, and that there may be embodiments that implement more or fewer operations than are disclosed. It may also be appreciated that there may be embodiments that implement the operations of FIG. 4 in a different order than they are depicted in FIG. 4.

It may further be appreciated that the operations of FIG. 4 may be implemented in conjunction with the operations of other figures. For example, the process of FIG. 4 may be implemented in conjunction with the process of FIG. 5, to encode a user password using steganography, and then later decode that same password for use as a credential to an online service.

In some embodiments, the process of FIG. 4 is used to implement a computer-implemented method for managing passwords using steganography. In some embodiments, the process of FIG. 4 is used to implement a computer system for managing passwords using steganography.

The process of FIG. 4 begins with operation 402 and then moves to operation 404. Operation 404 depicts receiving a master password for a password manager. This may be a password that a user enters into a user interface of a password manager application using an input device, such as a keyboard, mouse, or touch screen. The user may be prompted by the user interface to enter the password.

Generally, a password manager may store a plurality of credentials (e.g., user names and passwords) for a plurality of services. Then, all of these credentials may be secured within the password manager via the use of a master password, which a user enters in order to access these credentials that are stored by the password manager.

In some embodiments, operation 404 comprises receiving a master password for a password manager. In some embodiments, operation 404 comprises logging into a password manager. After operation 404, the process of FIG. 4 moves to operation 406.

Operation 406 depicts determining whether the master password is valid. A computing system that implements the process of FIG. 4 may store a representation of the master password. The computer system may store this master password in an encrypted form, using an encryption technique that makes it relatively hard to decrypt the stored master password.

Then, when a user enters a master password in operation 404, this input may be encrypted in a similar fashion as the stored master password has been encrypted, and the encrypted version of the stored master password may be compared with the encrypted version of the user's input for a master password. Where there is a match between the encrypted version of the stored master password and the encrypted version of the user's input, then it may be determined in operation 406 that the master password is valid.

In some embodiments, operation 406 comprises determining whether the master password is valid. Upon determining in operation 406 that the master password is valid, the process of FIG. 4 moves to operation 408. Instead, upon determining in operation 406 that the master password is not validnot valid, the process of FIG. 4 moves to operation 422.

Operation 408 is reached from operation 406 upon determining that the master password is valid. Operation 408 depicts selecting a service for generating credentials. In some embodiments, a computer system may provide a list of services (e.g., online email services, online social networking services, online banking services), and a user may provide user input indicative of selecting a service. In other embodiments, a user may identify the service without seeing a list of possible services, such as by entering a URL (uniform resource locator) that identifies a network address at which the service may be reached.

The embodiments described herein primarily concern storing credentials for online services. It may be appreciated that the present techniques may also be applied to non-online computer services, such as for storing credentials to a wireless access point (WAP) that the user maintains in his or her home.

In some embodiments, operation 408 comprises receiving an indication of an online service for which a first password is to be stored. After operation 408, the process of FIG. 4 moves to operation 410.

Operation 410 depicts displaying images. These images may be images stored on a computing device that implements the process of FIG. 4, such as photos that the user has taken with the computing device. In some embodiments, displaying images may be accompanied by a prompt in a user interface in which the images are being displayed for a user to select an image that he or she associates with the service for which credentials are being stored (e.g., a photo of a physical mailbox for storing credentials for an online email service).

In some embodiments, the computing device may restrict the images displayed in operation 410 to images that have been taken with the computing device. This restriction may be implemented because, if the image is commonly accessible, then after a steganographic image is generated from it, there may still be commonly accessible copies of the old image available. So, the steganographic image may be compared against the original image to determine how the image has been modified, which may make it easier to access a credential stored within the steganographic image.

In some embodiments, types of images that may be excluded include images that are pre-loaded onto the computing device from its factory settings (e.g., background wallpaper images, or example images), or images that have been downloaded from another computing device.

In some embodiments, operation 410 comprises, after determining whether the master password is valid, displaying a plurality of images that are stored in a computer memory. In some embodiments, operation 410 comprises displaying a plurality of images. In some embodiments, operation 410 comprises omitting an image that is preloaded on a computing device from the plurality of images that are displayed. In some embodiments, at least one image of the plurality of images has been captured with a camera of a computing device that comprises the computer memory. After operation 410, the process of FIG. 4 moves to operation 412.

Operation 412 depicts selecting an image. In some embodiments, the plurality of images of operation 410 are displayed to a user, and a computing device that implements the process of FIG. 4 receives user input indicative of selecting one of those images, such as receiving user input at a touch screen in a location where that image is being displayed.

In some embodiments, operation 412 comprises receiving user input indicative of selecting a first image of the plurality of images. After operation 412, the process of FIG. 4 moves to operation 414.

Operation 414 depicts receiving credentials. These credentials may comprise credentials used to log into the service identified in operation 408. For example, the credentials may comprise a user name, a password, both a user name and a password, or some other form of credential. The credentials may be received from user input received in a user interface that is displayed by a computing device that implements the process of FIG. 4.

In some embodiments, operation 414 comprises receiving an indication of the first password. After operation 414, the process of FIG. 4 moves to operation 416.

Operation 416 depicts determining whether the credentials are valid. In some embodiments, determining whether the credentials are valid comprises determining whether the credentials meet predetermined requirements for credentials for the service of operation 408. For example, the service may require that the password have a minimum character length, and contain at least one number and one upper case letter. Additionally, where the credentials comprise a user name, determining whether the credentials are valid may comprise determining whether the user name has not already been registered for the service by another user.

In some embodiments, determining whether the credentials are valid may comprise using the credentials to attempt to log into the service identified in operation 408. Where the credentials are successfully used to log into the service, the credentials may be considered to be valid.

Upon determining in operation 416 that the credentials are valid, the process of FIG. 4 moves to operation 418. Instead, upon determining in operation 416 that the credentials are not valid, the process of FIG. 4 moves to operation 422.

Operation 418 is reached from operation 416 upon determining that the credentials are valid. Operation 418 depicts generating a steganographic image. In some embodiments, the steganographic image may be generated based on the image selected in operation 412 and the credentials received in operation 414. In some embodiments, the steganographic image of operation 418 may be generated in accordance with the examples depicted in FIGS. 2-3.

In some embodiments, operation 418 comprises generating a steganographic image based on the first image and the indication of the first password. In some embodiments, operation 418 comprises encrypting the first password and generating the steganographic image based on the first image and an indication of the encrypted first password. In some embodiments, operation 418 comprises receiving an indication of a first user name and generating the steganographic image based on the first image, the indication of the first password, and the indication of the first user name. In some embodiments, operation 418 comprises generating the steganographic image based on the first image, the indication of the first password, and the indication of the online service. After operation 418, the process of FIG. 4 moves to operation 420.

In some embodiments, the image selected in operation 412 is already storing another set of credentials. In such embodiments, generating a steganographic image in operation 418 may comprise first decoding the credentials already stored in the selected image, appending the new credentials to this pre-existing data, and then re-encoding a steganographic image that comprises both sets of credentials (or, possibly, more than two sets of credentials). In some embodiments, there may be an upper limit to the number of sets of credentials that may be encoded into a particular image, because repeatedly encoding credentials into an image may run a risk of corrupting the image. This upper limit may be a predetermined number for images, or may be determined on a per-image basis based on the characteristics of that image.

Operation 420 depicts storing the steganographic image. In some embodiments, the first image may be replaced with the steganographic image. A reason for replacing the first image with the steganographic image is that, if the first image and the steganographic image (which is generated based on the first image) are both acceptable, then a malicious user may use the two images to determine how the steganographic image has changed relative to the first image, and this may compromise the security of the credentials stored within the steganographic image. Another reason for replacing the first image with the steganographic image is that, there being two nearly identical images stored by one computing device may be an indication to a malicious user that one of those images is a steganographic image that stores credentials.

In some embodiments, operation 420 comprises replacing the first image with the steganographic image in the plurality of images stored in the computer memory. In some embodiments, operation 420 comprises storing the steganographic image in place of the first image in a computer memory. After operation 420, the process of FIG. 4 moves to operation 424, where the process of FIG. 4 ends.

Operation 422 is reached from operation 406 upon determining that the master password is not valid, or from upon determining that the credentials are not valid in operation 416. Operation 422 depicts raising an error. In some embodiments, raising an error may comprise displaying in a user interface a message that there was an error associated with storing credentials for the service for the user. After operation 422, the process of FIG. 4 moves to operation 424, where the process of FIG. 4 ends.

Figure 5:
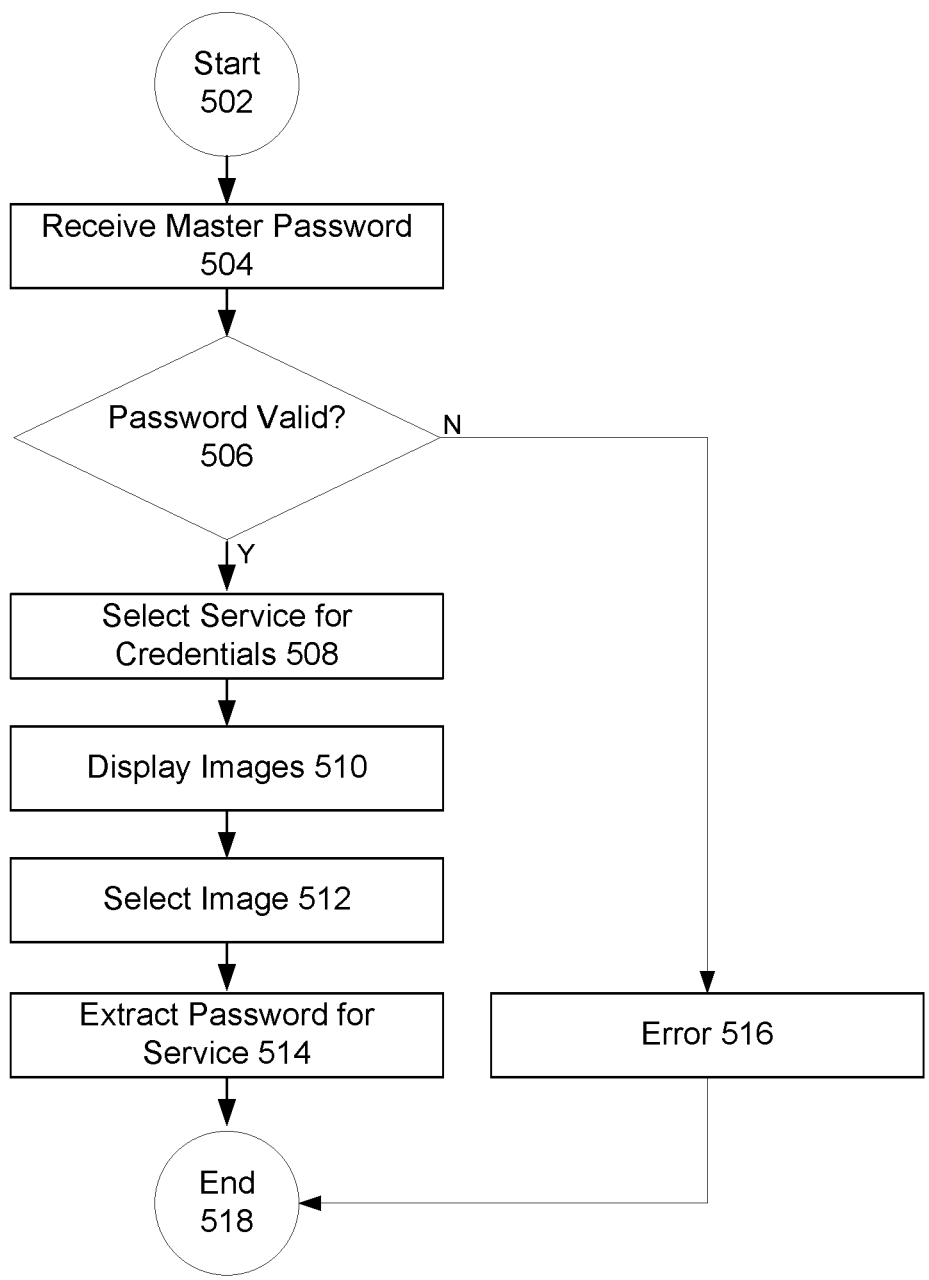
FIG. 5 illustrates an example process for encoding a password using steganography according to some embodiments of the present disclosure.

FIG. 5 illustrates an example process for encoding a password using steganography according to some embodiments of the present disclosure. In some embodiments, the process of FIG. 5 may be implemented on the computer hardware of FIG. 1 or the system architecture of FIG. 2 to effectuate managing passwords using steganography. It may be appreciated that the process of FIG. 5 is an example process, and that there may be embodiments that implement more or fewer operations than are disclosed. It may also be appreciated that there may be embodiments that implement the operations of FIG. 5 in a different order than they are depicted in FIG. 5.

It may further be appreciated that the operations of FIG. 5 may be implemented in conjunction with the operations of other figures. For example, the process of FIG. 5 may be implemented in conjunction with the process of FIG. 4, to encode a user password using steganography, and then later decode that same password for use as a credential to an online service.

The process of FIG. 5 begins with operation 502, and moves to operation 504. Operation 504 depicts receiving a master password for a password manager. In some embodiments, operation 504 may be implemented in a similar manner as operation 404 of FIG. 4.

In some embodiments, operation 504 comprises receiving the master password for the password manager a second time. As used herein in FIG. 5, some operations are described as occurring a second time. This second occurrence may be thought of in relation to similar operations being performed a first time in implementing the operations of FIG. 4. That is, the process of FIG. 4 depicts operations relating to receiving a password for a password manager. Then, the process of FIG. 5 has similar operations related to receiving a password for a password manager. Where credentials are first created (per the process of FIG. 4), and then later accessed (per the process of FIG. 5), then receiving a password for a password manager in the process of FIG. 5 may be thought of as occurring a second time.

It may be appreciated that there are also embodiments that omit performing these operations a second time. For example, a user may log into a password manager by providing a master password, create and store credentials for a service, then access those credentials without having logged out of the password manager. In such a scenario, it a user may not provide a master password for the password manager a second time, since he or she is already logged into the password manager when he or she begins accessing credentials for a service.

In some embodiments, operation 504 comprises logging into the password manager in response to receiving a valid password for the password manager. After operation 504, the process of FIG. 5 moves to operation 506.

Operation 506 depicts determining whether the master password is valid. In some embodiments, operation 506 may be implemented in a similar manner as operation 406 of FIG. 4. In some embodiments, operation 506 comprises determining whether the master password is valid a second time.

Upon determining in operation 506 that the master password is valid, the process of FIG. 4 moves to operation 508. Instead, upon determining in operation 506 that the master password is not valid, the process of FIG. 5 moves to operation 516.

Operation 508 is reached from operation 506 upon determining that the master password is valid. Operation 508 depicts selecting a service to provide with credentials. In some embodiments, operation 508 may be implemented in a similar manner as operation 408 of FIG. 4. In some embodiments, operation 508 comprises receiving an indication of the online service. After operation 508, the process of FIG. 5 moves to operation 510.

Operation 510 depicts displaying images. In some embodiments, operation 510 is implemented in a similar manner as operation 410 of FIG. 4. In some embodiments, operation 510 comprises, after determining that the master password is valid a second time, displaying the plurality of images. In some embodiments, operation 510 comprises, in response to receiving a request to access passwords, display the plurality of images. After operation 510, the process of FIG. 5 moves to operation 512.

Operation 512 depicts selecting an image. In some embodiments, operation 512 may be implemented in a similar manner as operation 412 of FIG. 4. In some embodiments, operation 512 comprises receiving user input indicative of selecting the first image of the plurality of images. After operation 512, the process of FIG. 5 moves to operation 514.

Operation 514 depicts extracting a password for the service. The password for the service (or other credentials, such as a user name) may be extracted from an image using an analog to the process used to generate the steganographic image in operation 418.

In some embodiments, the credentials extracted from the image in operation 418 may identify the service that the credentials are for. In such embodiments, operation 418 may further comprise determining whether the service identified in operation 408 matches the identification of the service extracted in operation 418. By validating that the proper service was identified in operation 408 in this manner, additional security may be added to storing and retrieving credentials, since a user may be prevented from accessing credentials by randomly selecting images, when he or she is unsure of which images store which credentials (perhaps because he or she was not the person who generated and stored the credentials, as in the process of FIG. 4).

In some embodiments, operation 514 comprises extracting the first password from the steganographic image, and providing the extracted first password as a credential to the online service. In some embodiments, operation 514 comprises receiving an indication of the online service, and verifying that the extracted password corresponds to the online service. After operation 514, the process of FIG. 5 moves to operation 518, where the process of FIG. 5 ends.

Operation 516 is reached from operation 506 upon determining that the master password is not valid. Operation 516 depicts raising an error. In some embodiments, operation 516 may comprise displaying a message that credentials were unable to be retrieved in a user interface, and may be implemented in a similar manner as operation 422 of FIG. 4. After operation 516, the process of FIG. 5 moves to operation 518, where the process of FIG. 5 ends.

CONCLUSION

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure is thorough and complete and fully conveys the scope of the present disclosure to those skilled in the art. In the description, details of well-known features and techniques may be omitted to avoid unnecessarily obscuring the presented embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to process or flowchart illustrations, and/or block diagrams of methods, apparatus (systems), and computer program products according to some embodiments of the present disclosure, and these illustrations may comprise one or more operations. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing passwords using steganography, the method comprising:
   receiving a master password for a password manager;
   determining whether the master password is valid;
   upon determining that the master password is valid, displaying a plurality of images that are stored in a computer memory, and displaying a list of computer services;
   receiving user input indicative of selecting a first image of the plurality of images;
   receiving the user input indicative of selecting a first computer service of the list of the computer services, for which a first password is to be stored;
   receiving an indication of the first password;
   generating a steganographic image based on the first image and the indication of the first password; and
   replacing the first image with the steganographic image in the plurality of images stored in the computer memory, wherein the replacement is performed to prevent a malicious user from using the two images to determine how the steganographic image has changed relative to the first image.

2. The computer-implemented method of claim 1, further comprising: receiving the master password for the password manager a second time; determining whether the master password is valid a second time; after determining that the master password is valid a second time, displaying the plurality of images; receiving a second indication of the first computer service; receiving user input indicative of selecting the first image of the plurality of images; extracting the first password from the steganographic image; and providing the extracted first password as a credential to the first computer service.

3. The computer-implemented method of claim 1, further comprising: encrypting the first password; and generating the steganographic image based on the first image and an indication of the encrypted first password.

4. The computer-implemented method of claim 1, further comprising: omitting an image that is preloaded on a computing device from the plurality of images that are displayed.

5. The computer-implemented method of claim 1, wherein at least one image of the plurality of images is captured with a camera of a computing device that includes the computer memory.

6. The computer-implemented method of claim 1, further comprising: receiving an indication of a first user name; and generating the steganographic image further based on the first image, the indication of the first password, and the indication of the first user name.

7. The computer-implemented method of claim 1, further comprising: generating the steganographic image further based on the first image, the indication of the first password, and the selected first computer service.

8. A computer system configured to manage passwords using steganography, comprising: a processor, a computer-readable memory, a computer-readable tangible storage device, and program instructions stored on the storage device for execution by the processor via the memory, wherein execution of the program instructions by the computer system configures the computer system to:
   log into a password manager;
   upon a determination that the login is successful, display a plurality of images and a list of computer services;
   receive user input indicative of selecting a first image of the plurality of images;
   receive the user input indicative of selecting a first computer service of the list of the computer services, for which a first password is to be stored;
   receive an indication of the first password;
   generate a steganographic image based on the first image and the indication of the first password; and
   store the steganographic image in place of the first image in a computer memory, such that the first image is replaced with the steganographic image to prevent a malicious user from using the two images to determine how the steganographic image has changed relative to the first image.

9. The computer system of claim 8, wherein execution of the program instructions further configures the computer system to: in response to receiving a request to access passwords, display the plurality of images; receive user input indicative of selecting the first image of the plurality of images; and extract the first password from the steganographic image.

10. The computer system of claim 9, wherein execution of the program instructions further configures the computer system to: receive an indication of a computer service; and verify that the extracted first password corresponds to the computer service.

11. The computer system of claim 10, wherein execution of the program instructions further configures the computer system to: provide the extracted first password as a credential to the computer service.

12. The computer system of claim 9, wherein execution of the program instructions further configures the computer system to: log into the password manager in response to receiving a valid password for the password manager.

13. The computer system of claim 9, wherein execution of the program instructions further configures the computer system to: receive an indication of a first user name; and generate the steganographic image further based on the first image, the indication of the first password, and the indication of the first user name.

14. The computer system of claim 9, wherein execution of the program instructions further configures the computer system to: generate the steganographic image further based on the first image, the indication of the first password, and the selected first computer service.

15. A computer program product, comprising:
a computer readable storage medium having program instructions embodied therewith, the program instructions executable by a computer cause the computer to:
log into a password manager;
upon a determination that the login is successful, display a plurality of images and a list of computer services;
receive user input indicative of selecting a first image of the plurality of images;
receive the user input indicative of selecting a first computer service of the list of the computer services, for which a first password is to be stored;
receive an indication of the first password;
generate a steganographic image based on the first image and the indication of the first password; and
store the steganographic image in place of the first image in a computer memory, such that the first image is replaced with the steganographic image to prevent a malicious user from using the two images to determine how the steganographic image has changed relative to the first image.

16. The computer program product of claim 15, wherein the program instructions executable by the computer further cause the computer to: in response to receiving a request to access passwords, display the plurality of images; receive user input indicative of selecting the first image of the plurality of images; and extract the first password from the steganographic image.

17. The computer program product of claim 15, wherein the program instructions executable by the computer further cause the computer to: verify that an extracted password corresponds to the first computer service.

18. The computer program product of claim 15, wherein the program instructions executable by the computer further cause the computer to: encrypt the first password; and generate the steganographic image based on the first image and an indication of the encrypted first password.

19. The computer program product of claim 15, wherein the program instructions executable by the computer further cause the computer to: omit an image that is preloaded on the computer from the plurality of images that are displayed.

20. The computer program product of claim 15, wherein at least one image of the plurality of images has been captured with a camera of the computer.

* * * * *